(12) United States Patent
Bruder et al.

(10) Patent No.: US 11,798,127 B2
(45) Date of Patent: *Oct. 24, 2023

(54) SPATIAL POSITIONING OF TARGETED OBJECT MAGNIFICATION

(71) Applicant: University of Central Florida Research Foundation, Inc., Orlando, FL (US)

(72) Inventors: Gerd Bruder, Orlando, FL (US); Gregory Welch, Orlando, FL (US); Kangsoo Kim, Orlando, FL (US); Zubin Choudhary, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/853,072

(22) Filed: Jun. 29, 2022

(65) Prior Publication Data
US 2023/0289920 A1 Sep. 14, 2023

Related U.S. Application Data

(63) Continuation of application No. 17/330,679, filed on May 26, 2021, now Pat. No. 11,410,270.
(Continued)

(51) Int. Cl.
*G06T 3/40* (2006.01)
*G06T 7/194* (2017.01)
(Continued)

(52) U.S. Cl.
CPC .............. *G06T 3/40* (2013.01); *G06T 7/194* (2017.01); *G06T 7/73* (2017.01); *G06T 19/006* (2013.01); *G06V 10/764* (2022.01)

(58) Field of Classification Search
CPC .......... G06F 3/011; G06F 3/017; G06F 3/013; G06F 3/04815; G06F 3/0484; G06F 3/04842; G06F 3/012; G06F 2203/04806; G06F 2203/04805; G06F 2203/04802; G06T 2200/24; G06T 19/006; G06T 15/20; G06T 3/40; G06T 19/00; G06T 7/70; G06T 2219/2016; G06T 13/40;
(Continued)

(56) References Cited

U.S. PATENT DOCUMENTS 7,787,012 B2   8/2010   Scales et al.
9,229,230 B2   1/2016   Scales et al.

OTHER PUBLICATIONS

Choudhary et al., Virtual Big Heads: Analysis of Human Perception and Comfort of Head Scales in Social Virtual Reality, 2020 IEEE Conference on Virtual Reality and 3D User Interfaces (VR), pp. 425-433.

*Primary Examiner* — Xiao M Wu
*Assistant Examiner* — Scott E Sonners
(74) *Attorney, Agent, or Firm* — Anton J. Hopen; Smith & Hopen, P. A.

(57) ABSTRACT

One or more cameras capture objects at a higher resolution than the human eye can perceive. Objects are segmented from the background of the image and scaled to human perceptible size. The scaled-up objects are superimposed over the unscaled background. This is presented to a user via a display whereby the process selectively amplifies the size of the objects' spatially registered retinal projection while maintaining a natural (unmodified) view in the remainder of the visual field.

13 Claims, 19 Drawing Sheets
(19 of 19 Drawing Sheet(s) Filed in Color)

Related U.S. Application Data

(60) Provisional application No. 63/034,153, filed on Jun. 3, 2020.

(51) Int. Cl.
*G06V 10/764* (2022.01)
*G06T 19/00* (2011.01)
*G06T 7/73* (2017.01)

(58) Field of Classification Search
CPC . G06T 2207/30196; G06T 2207/30201; G06T 2207/20221; G06T 2219/024; G06T 2210/36; G06T 7/194; H04N 5/2628
See application file for complete search history.

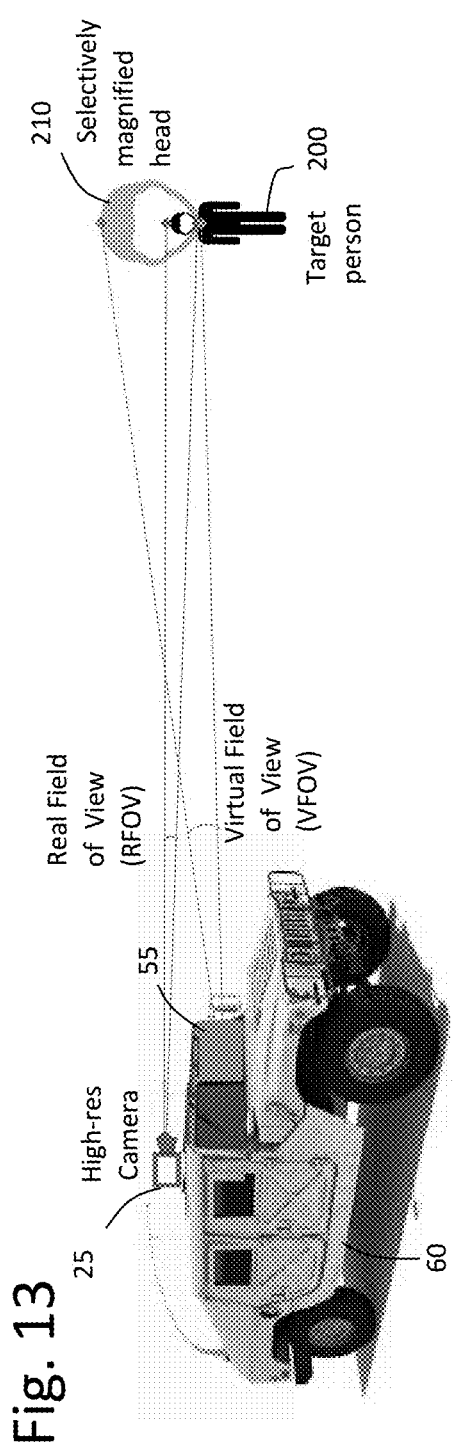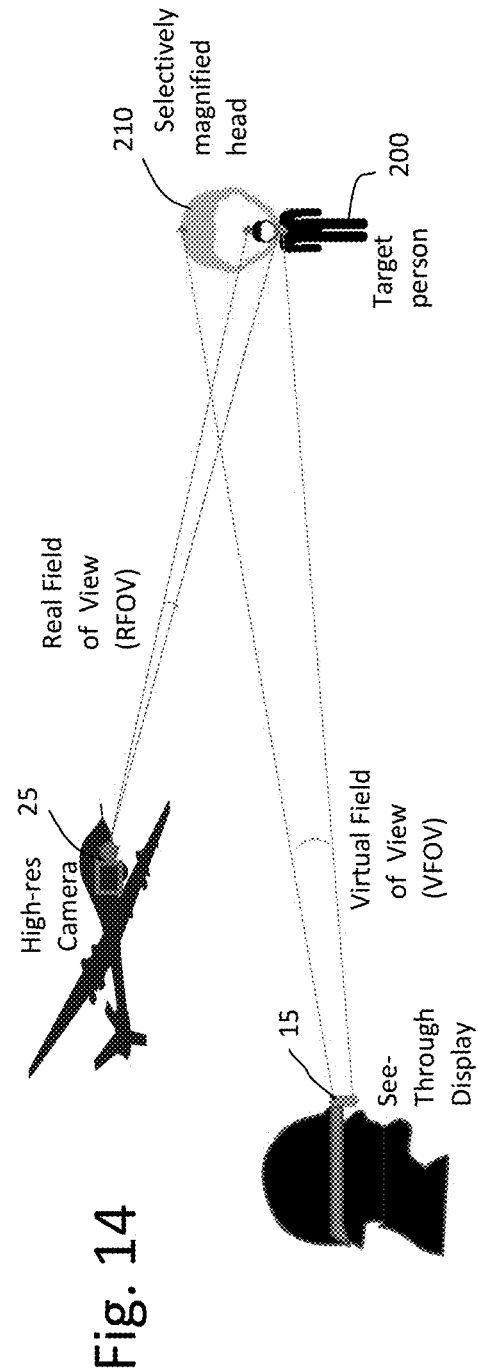

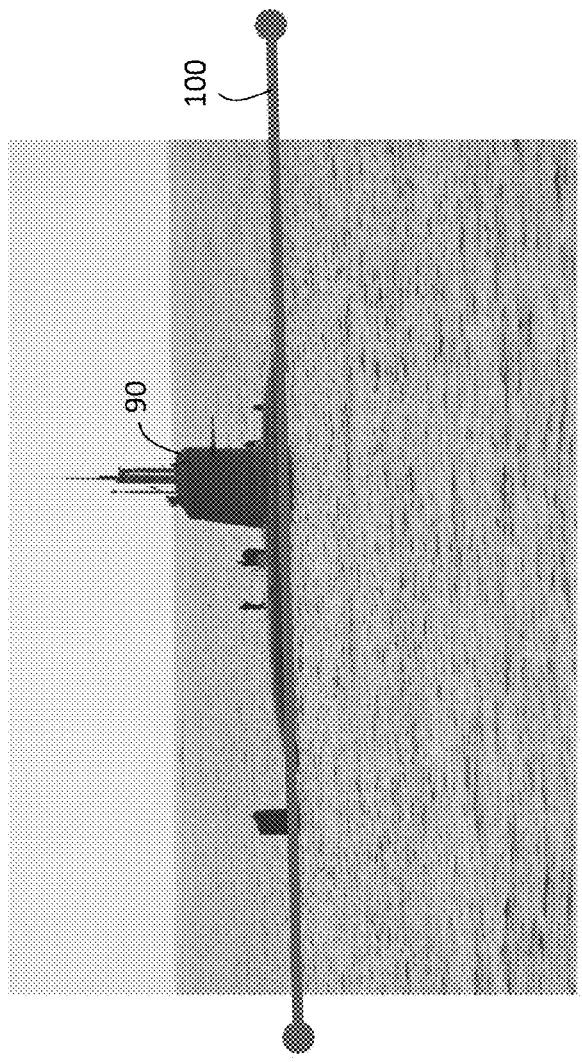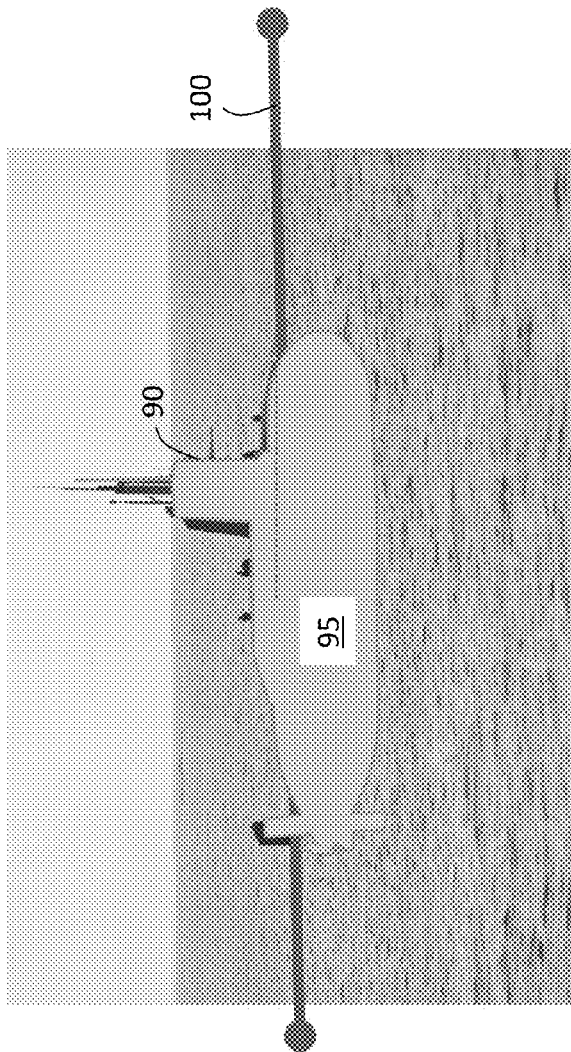
Fig. 21
Fig. 22

SPATIAL POSITIONING OF TARGETED OBJECT MAGNIFICATION

PRIORITY CLAIM

This application claims priority to U.S. non-provisional patent application Ser. No. 17/330,679, entitled "Intelligent Object Magnification for Augmented Reality Displays", filed on May 26, 2021, which, in turn, claims priority to U.S. provisional patent application Ser. No. 63/034,153, entitled "Intelligent Object Magnification for Augmented Reality Displays", filed on Jun. 3, 2020, the contents of which are herein incorporated by reference.

GOVERNMENT INTEREST

This invention was made with Government support under Grant No. N000141812927 awarded by the Office of Naval Research. The Government has certain rights in the invention.

BACKGROUND OF THE INVENTION

1. Field of the Invention

The described embodiments generally relate to electronic vision systems.

Specifically, the described embodiments relate to systems and methods for selectively magnifying digitally captured objects and logically positioning those magnified objects.

2. Brief Description of the Related Art

Human vision allows us to perceive the surrounding environment via light in the visible spectrum, e.g., reflected off objects in the environment. However, the density of rods and cones on the retina naturally limits our visual acuity. If the size of a physical object's projection on the retina falls below a perception threshold, we are unable to perceive it or its details visually. For instance, a vehicle moving away from us causes its retinal size to shrink, which means that it is gradually perceived with fewer and fewer details until it becomes indistinguishable from the background at a threshold distance.

Two recent technological advances have much promise in this direction. First, cameras are now capable of reaching a far superior resolution than the human eye (such as gigapixel cameras), allowing us to use computer displays to up-scale (magnify) an image to perceive visual details at a larger retinal size than occurs naturally. Second, augmented reality (AR) see-through displays, such as head-mounted displays (HMDs) or heads-up displays (HUDs), enable us to seamlessly blend digital imagery with a view of the real world. By integrating a camera and an AR display, we can register and overlay a captured image of an object in real-time over the same portion of a user's visual field, and we can magnify it.

U.S. Pat. No. 7,787,012 to Scales et al. describes a system in which an image from a rifle-mounted video source is superimposed on an image seen through a pair of goggles. Sensors coupled to the rifle and the goggles provide data indicating movement of the goggles and rifle. An image from the rifle-mounted source shows an external region within the source's field of view (FOV). The goggles have a wider FOV and provide an image that includes a portion showing the same region, as is shown in the image from the rifle-mounted video source. The sensor data is then used to determine the relative orientation of the two sources and calculate a location for the rifle image within the image seen through the goggles.

U.S. Pat. No. 9,229,230 also to Scales et al. describes using two video sources (e.g., one contained in a pair of goggles and another mounted to a rifle as described in the '012 patent referenced above) to calculate a location with inertial measurement unit (IMU) sensor data for the coordinated images and then generate icons or other graphics relating to real-world objects as they appear in the field of view.

BRIEF SUMMARY OF THE INVENTION

We have developed a novel approach that uses cameras to capture objects at a higher resolution than the human eye can perceive, and presents imagery of the objects to a user via an AR display that selectively amplifies the size of the objects' spatially registered retinal projection while maintaining a natural (unmodified) view in the remainder of the visual field.

The benefits of our approach over binoculars or other existing approaches are multifold. First, we can seamlessly increase the perceived size of real-world objects in a user's view, enabling them to see more details than they would be naturally capable of Second, we can selectively magnify specific objects without the need to magnify the entire visual field (as happens with binoculars). Third, we can automatically determine salient/important objects (region of interest) to be magnified from the (less important) background. Fourth, we can automatically compute the optimal magnification factor for these objects to present them at a size that exceeds the human perception threshold. At the same time, we can avoid magnifying the objects more than needed (e.g., to prevent the occlusion of other important objects in the environment). Fifth, our approach can take individual differences into account and be adjusted for each user's visual acuity (e.g., making objects bigger for a near-sighted user). Lastly, our approach works in real-time with one or multiple users, cameras, and displays.

In general, a digital camera captures a real-time image stream. Preferably, the camera is a high-resolution of at least 52 megapixels or, for some applications, over 500 megapixels. The image stream generated is accessed by a first computer processor having at least one computer vision algorithm. The vision algorithm classifies a target for a pre-defined category from the image stream. The target may be a face, weapon, hand gesture, rank/insignia, vehicle, ship or the like. The image stream of the classified target has a foreground representing the target and a background in which the target exists. From this, the foreground of the classified target is segmented into an image region by the first computer processor. Alternatively, to distribute the computational load, second and third processors such a graphic processing units (GPUs) may be used for individual tasks within this invention's method and apparatus configuration. The image region is segmented from the background such as that substantially only those pixels showing the image region are further processed.

The image region is transmitted to a rendering engine to generate an output for an augmented reality see-through display such as a heads-up display or head-mounted display. In the rendering engine, a first mathematical transformation is created defining the relative spatial difference between the digital camera and the augmented reality see-through display. The rendering engine further creates a second scaling transformation defining the factor by which the segmented image region should be up-scaled compared to the unmodified, classified target. The rendering engine then generates pixels of the image region relative to the augmented reality see-through display, the image region modified by the first and second transformations. Finally, the pixels of the image region are superimposed over the otherwise unmagnified background through the augmented reality see-through display.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For a fuller understanding of the invention, reference should be made to the following detailed description, taken in connection with the accompanying drawings, in which:

FIG. 13 is a diagrammatic view of an embodiment of the invention showing a vehicle-mounted camera wherein the head of a targeted person is selectively magnified on a see-through windshield display.

FIG. 14 is a diagrammatic view of an embodiment of the invention showing a drone-mounted camera wherein the head of a targeted person is selectively magnified on a soldier's HMD.

FIG. 21 is an annotated image view of an embodiment of the invention showing a ship-mounted camera view of a partially submerged submarine.

FIG. 22 is an annotated image view of an embodiment of the invention showing a ship-mounted, graphically enhanced camera view of a partially submerged submarine.

DETAILED DESCRIPTION OF THE PREFERRED EMBODIMENT

Figure 1:
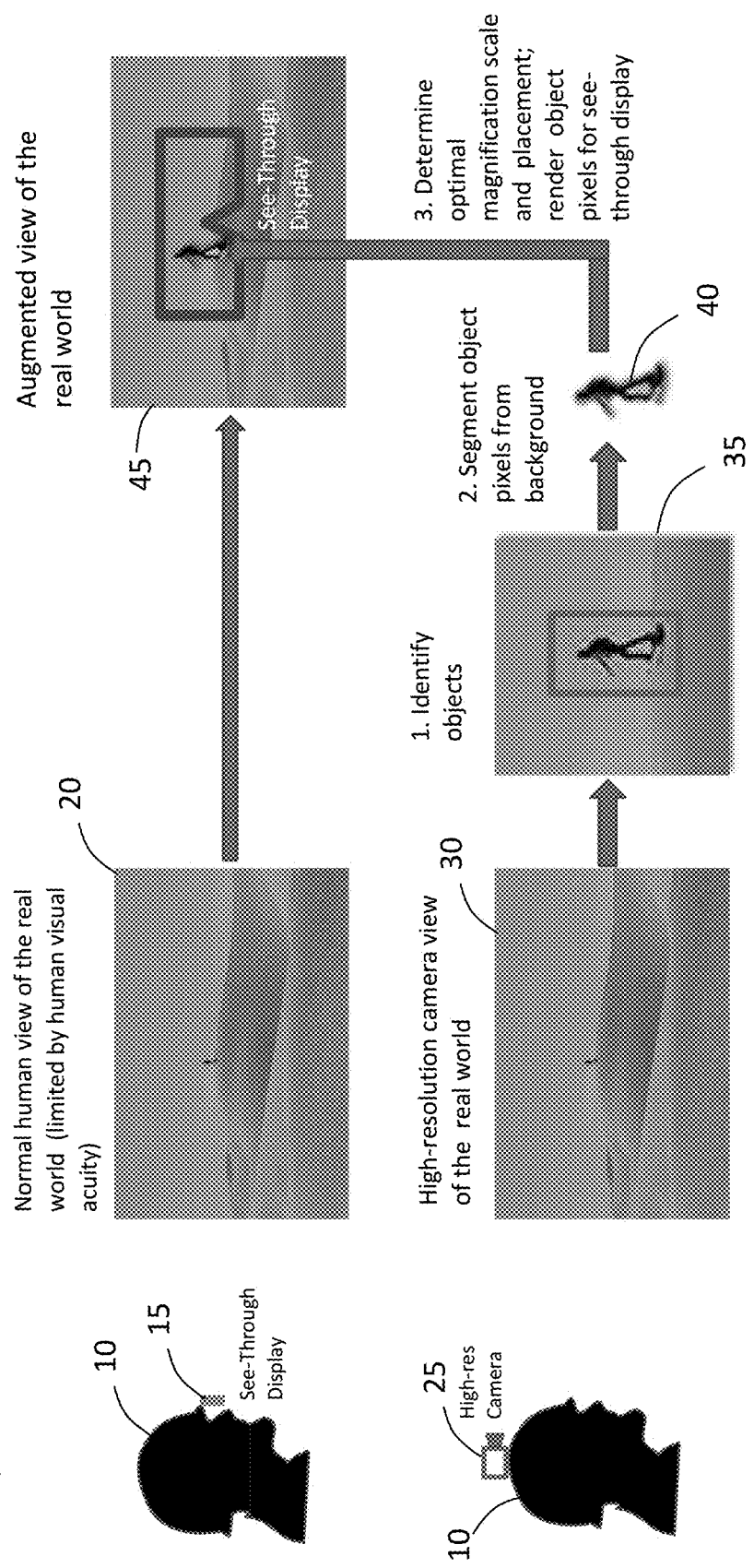
FIG. 1 is a diagrammatic view of an embodiment of the invention showing selective visual magnification.

Existing visual magnification systems (e.g., binoculars or camera zoom) are not capable of selectively magnifying certain objects in the visual field while maintaining the original size of objects in the remainder of the visual field. This invention not only allows one or multiple objects in the visual field to be magnified but also to automatically determine salient/important objects (region of interest) to be magnified from the (less important) background, without changing the remainder of the visual field. Moreover, the system can automatically compute a reasonable/optimal magnification factor for objects and present them at a size that exceeds the necessary perception threshold. At the same time, we can avoid magnifying them more than needed (e.g., to prevent the occlusion of other important objects in the environment).

This approach gives users dynamic control over each object's magnification factor (e.g., presenting one object or class of objects larger than others). The system can take individual differences into account and be adjusted for each user's visual acuity (e.g., making objects bigger for a near-sighted user). Lastly, this invention operates in real-time. It is agnostic to specific hardware configurations in that it can be realized with one or multiple users, cameras, displays, and tracking systems.

Potential uses of this invention are manifold. With the increasing use of AR displays across different work domains in outdoor spaces, there is a high potential for our visual magnification approach to improve their effectiveness.

For instance, in the military, an integrated AR magnification system could be used to make distant objects appear bigger in the user's visual field, such as enemy combatants, civilians, vehicles, ships, or airplanes, while preserving the frame of reference in the remainder of the visual field. For example, when gigapixel cameras are mounted in 360 degrees around a ship, this information is streamed to individual sailors wearing an AR HMD. With this method, other ships appear bigger in their visual field, thus making it easier to see/identify them, judge their motion/behavior, shoot at them, etc.

In the civilian world, the magnification of salient landmarks is a desirable feature for common navigation systems, e.g., in heads-up displays in cars. Moreover, there are various special uses, such as magnifying humans in land/sea rescue missions, magnifying players during sports events, or magnifying deer or road signs while driving. The AR magnification systems can also be useful for people experiencing vision impairment to enhance their visual sensing ability. An example of how this process could be realized is outlined in multiple steps below with reference to the drawings.

Generally, an imaging sensor is used to capture real-time imagery of the real world. For some embodiments, any type of camera could be used, such as a common webcam, a gigapixel camera, or 360-degree omnidirectional cameras. The real-time image stream from the camera is then fed into a processing unit (computer). This is accomplished using a wired or wireless connection.

The current camera image is processed using computer vision algorithms to classify targets of a pre-defined category. For instance, using deep neural networks, vehicles can be classified in the image. The corresponding image regions (pixels: xmin, . . . , xmax; ymin, . . . , ymax) are stored for each classified target. For each classified target, the image region is processed using computer vision algorithms to segment the foreground target from the background such that only those pixels remain that show the target while the rest of the image is excluded from further processing.

The segmented image region is sent to a rendering engine to generate the output for the AR see-through display. The rendering engine creates a mathematical transformation M that describes the relative spatial difference from the camera to the display. This can be accomplished using a commercial tracking system or be pre-defined in case of a static configuration (such as between a camera and a display mounted rigidly on the same vehicle or helmet). In the latter case, this must be done only once.

The rendering engine then creates a mathematical transformation S that describes the factor by which the augmented target should be up-scaled compared to the real target. Results from the psychophysics literature indicate different visual thresholds for objects up to which certain visual details can be perceived. For instance, Paul Eckman found that facial expressions on a human face can only be perceived up to 40 meters distance. Hence, optimal scaling factors based on these thresholds may be applied, e.g., scaling up the size of a person's head who is farther than 40 meters away to the head size of one that is 40 meters away. This makes it possible for the facial expressions to be perceived, while it at the same time makes sure that the head is not scaled up more than necessary, which could otherwise occlude other important parts of the visual field. Similar thresholds can be derived for other object classes.

The rendering engine can then introduce an additional mathematical transformation T to move the up-scaled image region depending on pre-defined constraints. For instance, if the target is a ship, a constraint is that the up-scaled ship should be presented on the water level and not above or below it. An approximation of this can be accomplished by computing the vertical size of the up-scaled ship, subtracting the vertical size of the real-scale ship, and translating the up-scaled ship by half this difference upwards. A similar approximation also works for human heads. In situations where approximations are not sufficient, an additional commercial tracking system could be used to determine these offsets.

The rendering engine then renders the pixels from the image region, transformed by M, translated by T, and scaled by S for the see-through display. Depending on the resolution of the display, the rendered image might have a different (usually lower) resolution than the camera's image.

The rendered image region is then presented to the user on the see-through display. This can be an optical see-through display (such as a Microsoft HoloLens or Magic Leap One or an in-car windshield heads-up display), which results in an optical overlay subtended over the view of the real world, or a video see-through display (such as an HTC VIVE Pro), including mobile AR devices such as an iPhone or similar. In the latter cases, a video feed of the real world from the display (via an additional display-mounted camera) is blended with the overlay.

The benefits of our approach over binoculars or other existing approaches are multifold: First, we can seamlessly increase the perceived size of real-world objects in a user's view, enabling them to see more details than they would be naturally capable of Second, we can selectively magnify specific objects without the need to magnify the entire visual field (as happens with binoculars). Third, we can automatically determine salient/important objects (region of interest) to be magnified from the (less important) background. Fourth, we can automatically compute a reasonable/optimal magnification factor for different object types to present them at a size that exceeds the human perception threshold. At the same time, we can avoid magnifying them more than needed (e.g., to prevent the occlusion of other important objects in the environment). Fifth, our approach can take individual differences into account and be adjusted for each user's visual acuity (e.g., making objects bigger for a near-sighted user). Lastly, our approach works in real-time with one or multiple users, cameras, and displays.

Turning now, to FIG. 1, an illustration is provided of the selective visual magnification method based on the two hardware components on the left, resulting in the view on the right. Specifically, operator 10 employs a see-through display 15 in which a normal human view of the real world 20 is displayed. Operator 10 (or a second operator) also has a high-resolution camera 25 that produces a high-resolution camera view of the real world 30. The high-resolution camera view is processed by an integrated circuit or separate processor to identify objects 35. An identified object is segmented from the background 40, and the optical magnification scale and placement is determined. The magnified object is then presented in an augmented view of the real world 45.

Figure 2:
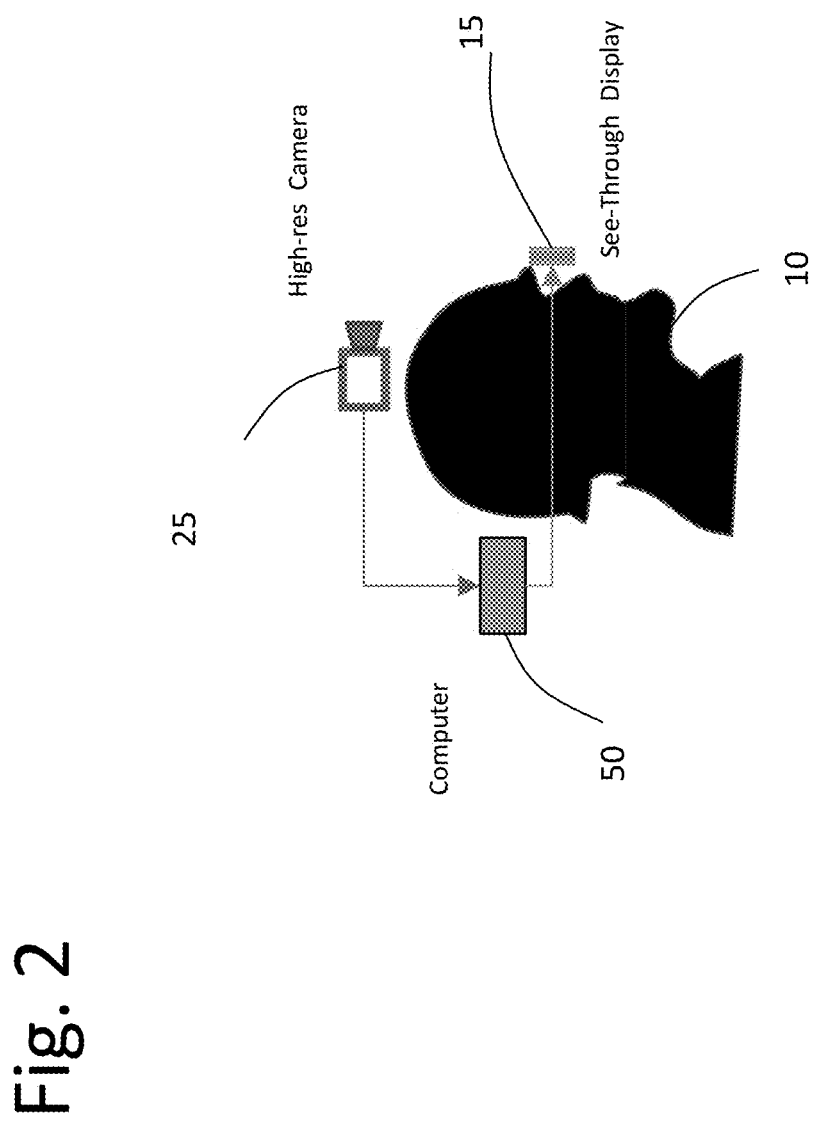
FIG. 2 is a diagrammatic view of an embodiment of the invention showing a helmet/head-mounted assembly.
Figure 3:
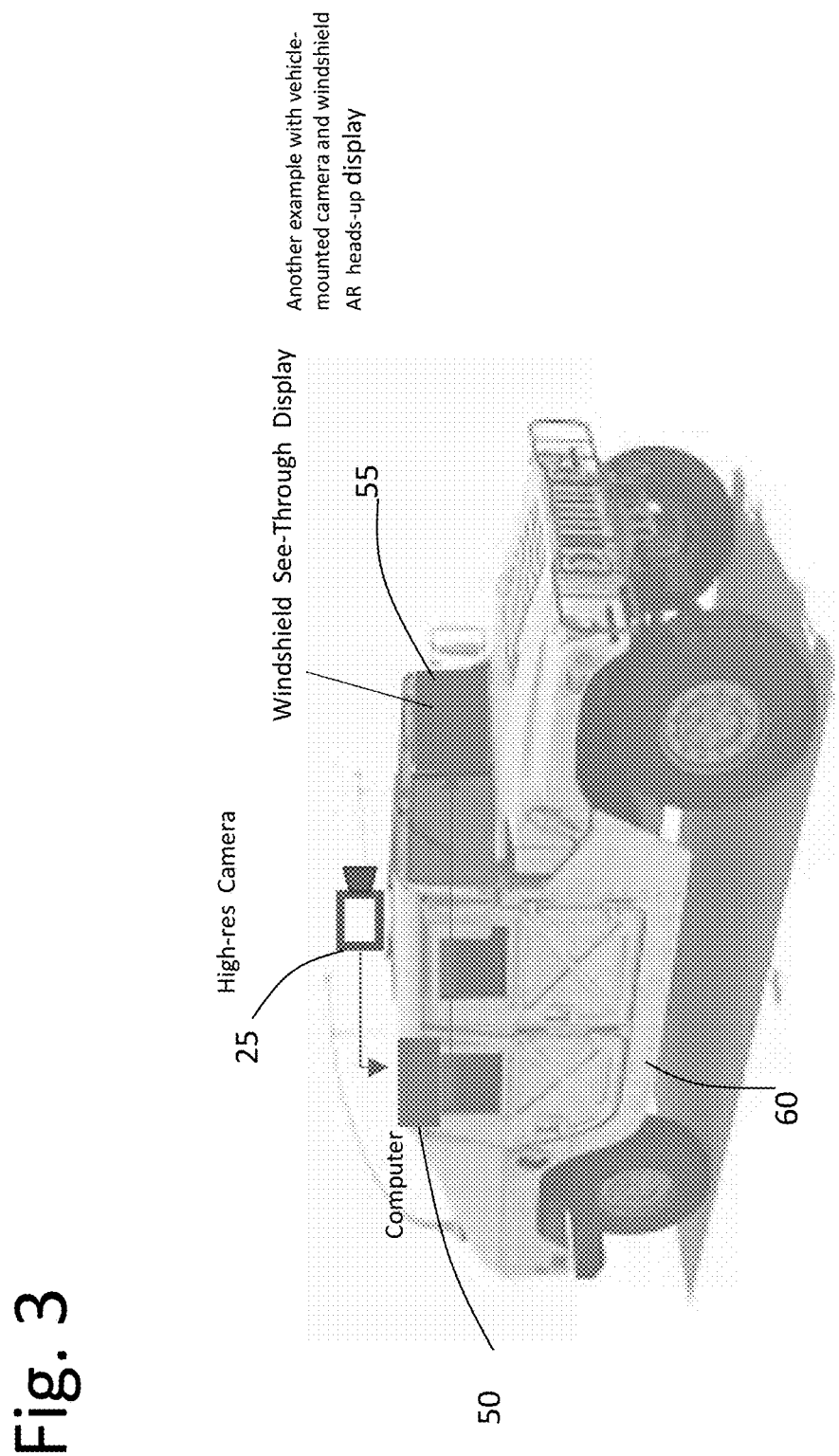
FIG. 3 is a diagrammatic view of an embodiment of the invention showing a vehicle-mounted assembly.

FIG. 2 illustrates connections (either wired or wireless) between the camera 25, computer (processing unit) 50, and see-through display 15, all worn by operator 10 in a head-mounted/helmet configuration. FIG. 3 shows a vehicle-mounted camera 25 affixed to a military vehicle 60 and a windshield augmented reality heads-up display 55.

Figure 4:
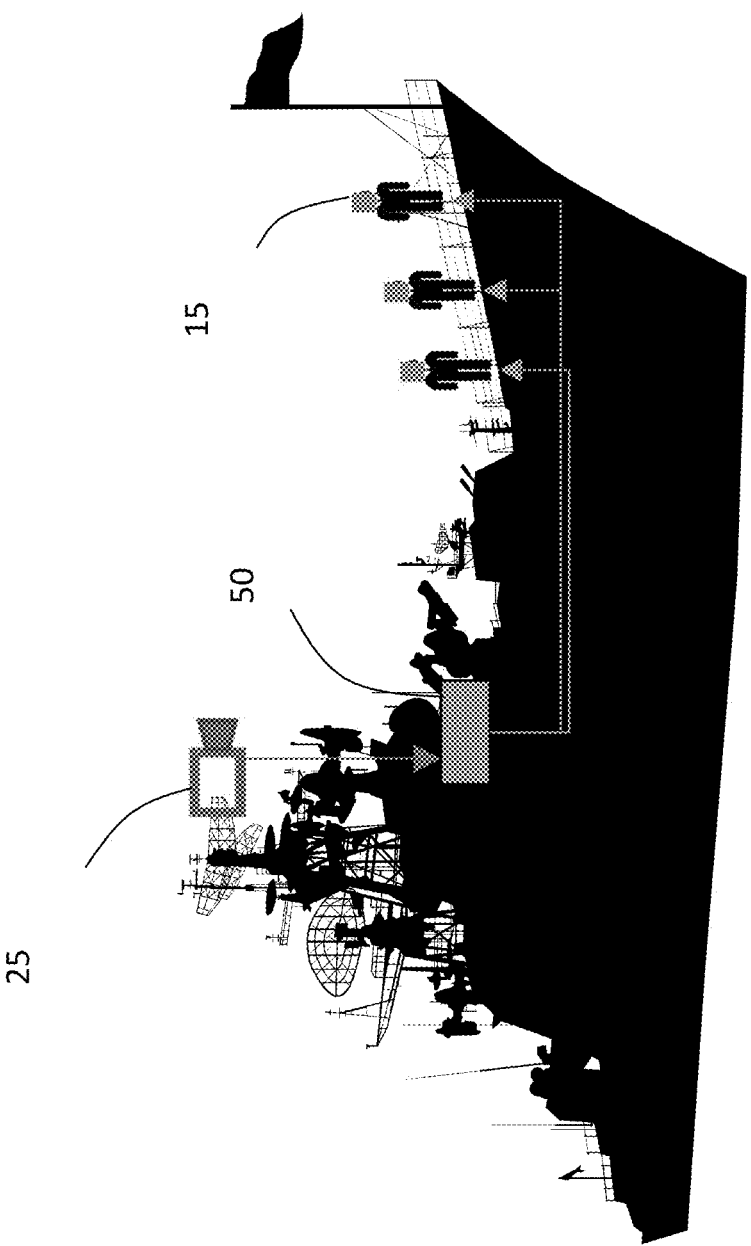
FIG. 4 is a diagrammatic view of an embodiment of the invention showing a ship-mounted assembly.
Figure 5:
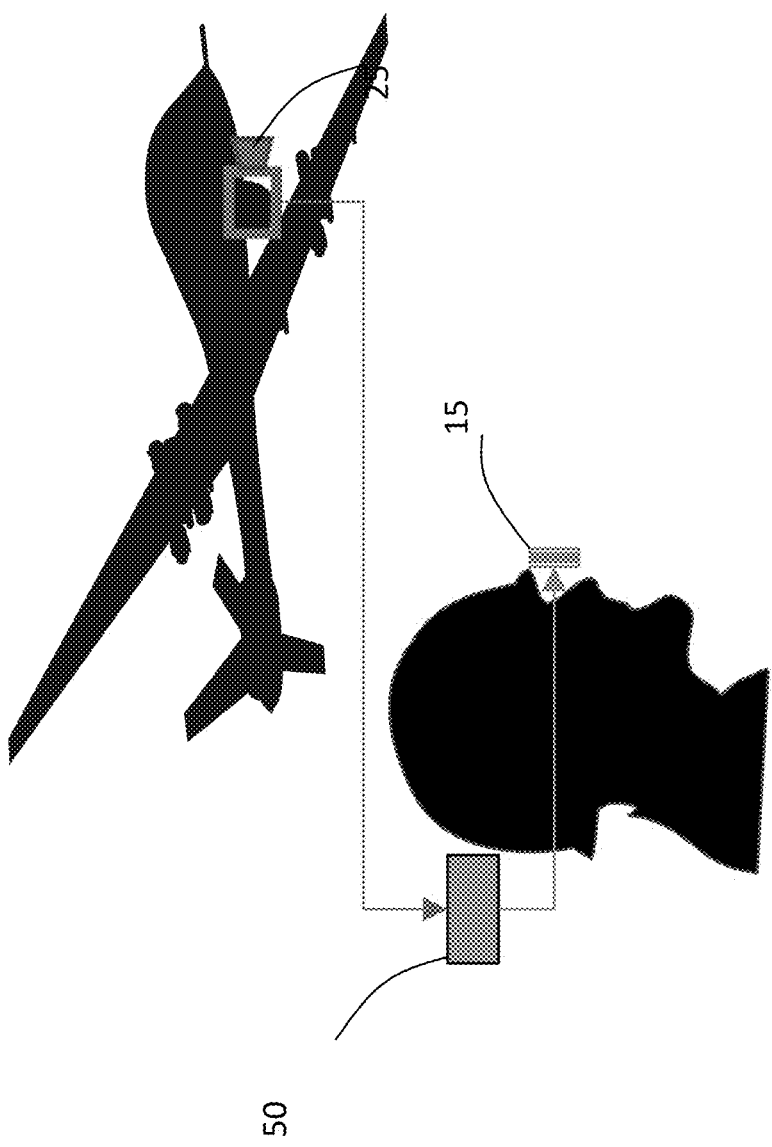
FIG. 5 is a diagrammatic view of an embodiment of the invention showing a drone-mounted camera communicatively coupled to a helmet-mounted assembly.
Figure 6:
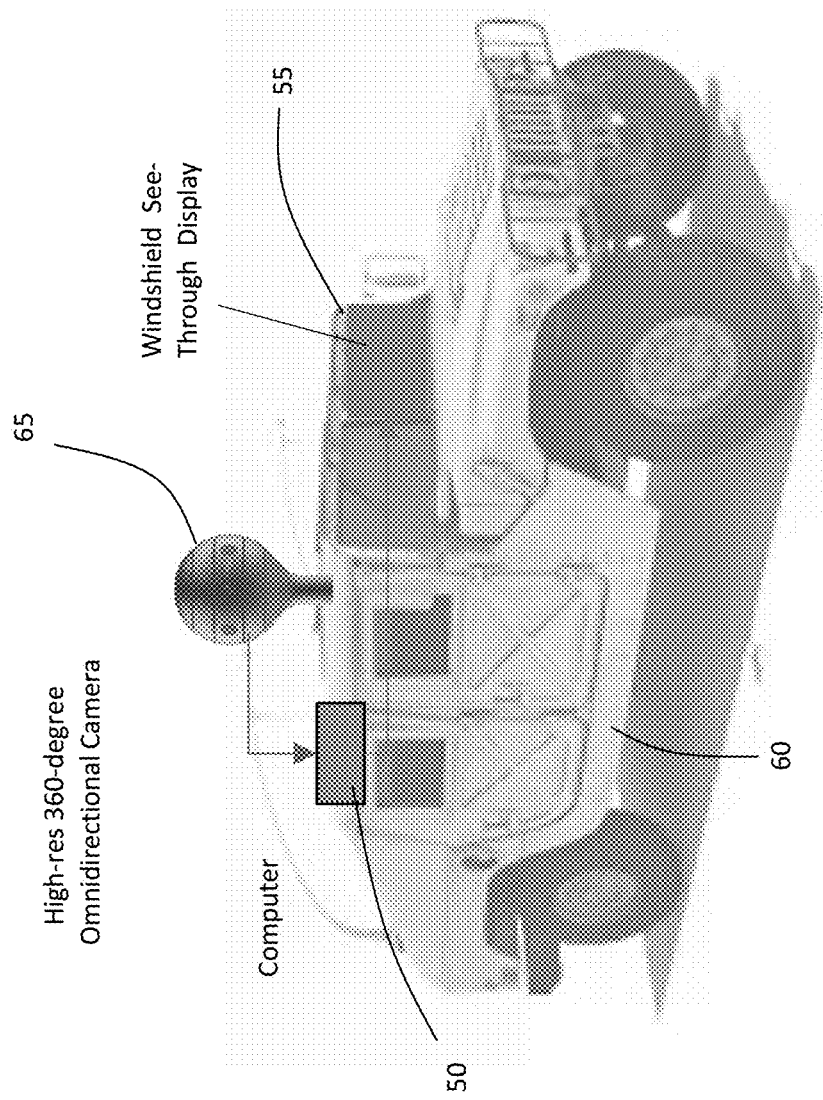
FIG. 6 is a diagrammatic view of an embodiment of the invention showing a 360-degree, omnidirectional vehicle-mounted assembly.
Figure 7:
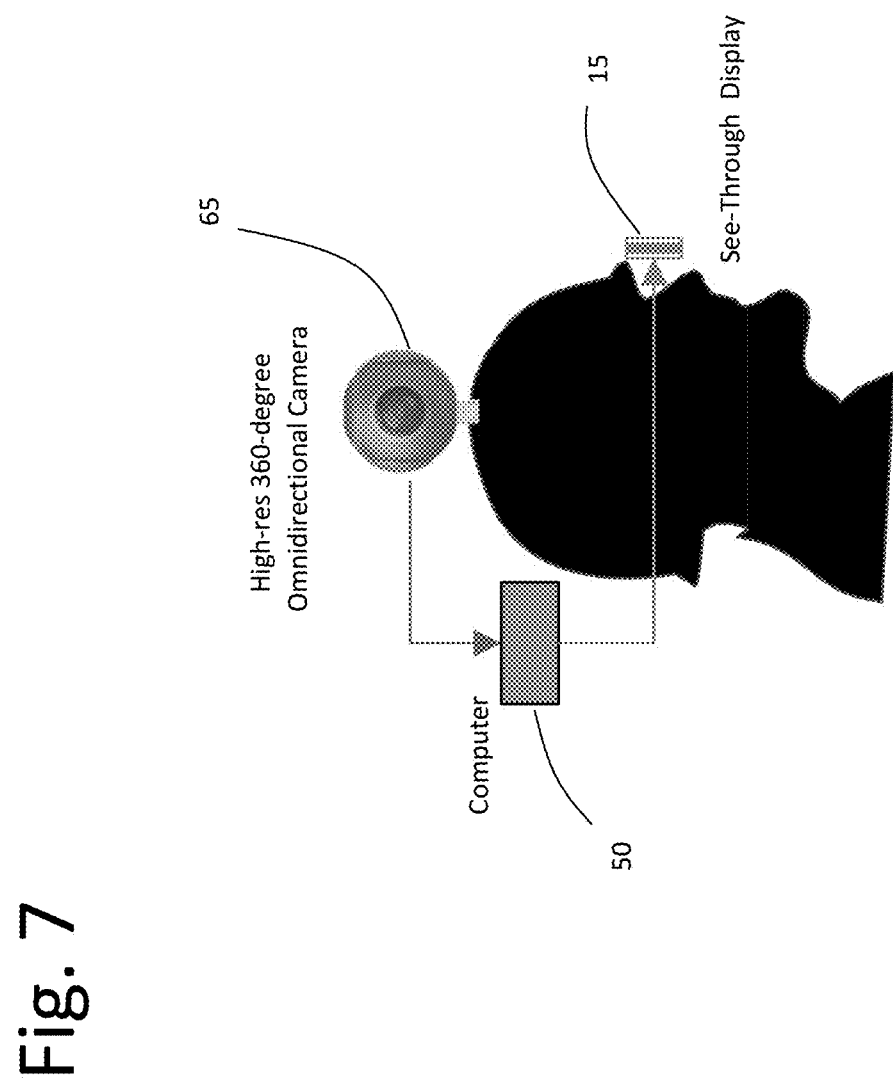
FIG. 7 is a diagrammatic view of an embodiment of the invention showing a 360-degree, omnidirectional helmet-mounted assembly.

FIG. 4 shows a ship-mounted camera 25 with multiple users 15 with head-worn see-through displays communicatively coupled to computer processor 50 through a wireless connection. FIG. 5 shows a drone-mounted camera 25 conveying imagery to computer 50, which then renders an identified target object onto see-through display 15. FIG. 6 shows omnidirectional camera 65 affixed to the top of military vehicle 60. Computer 50 received image data from omnidirectional camera 65 and renders detected objects on windshield see-through display 55. FIG. 7 shows omnidirectional camera 65 affixed to a helmet and coupled to computer 50, which renders detected objects on see-through display 15.

Figure 8:
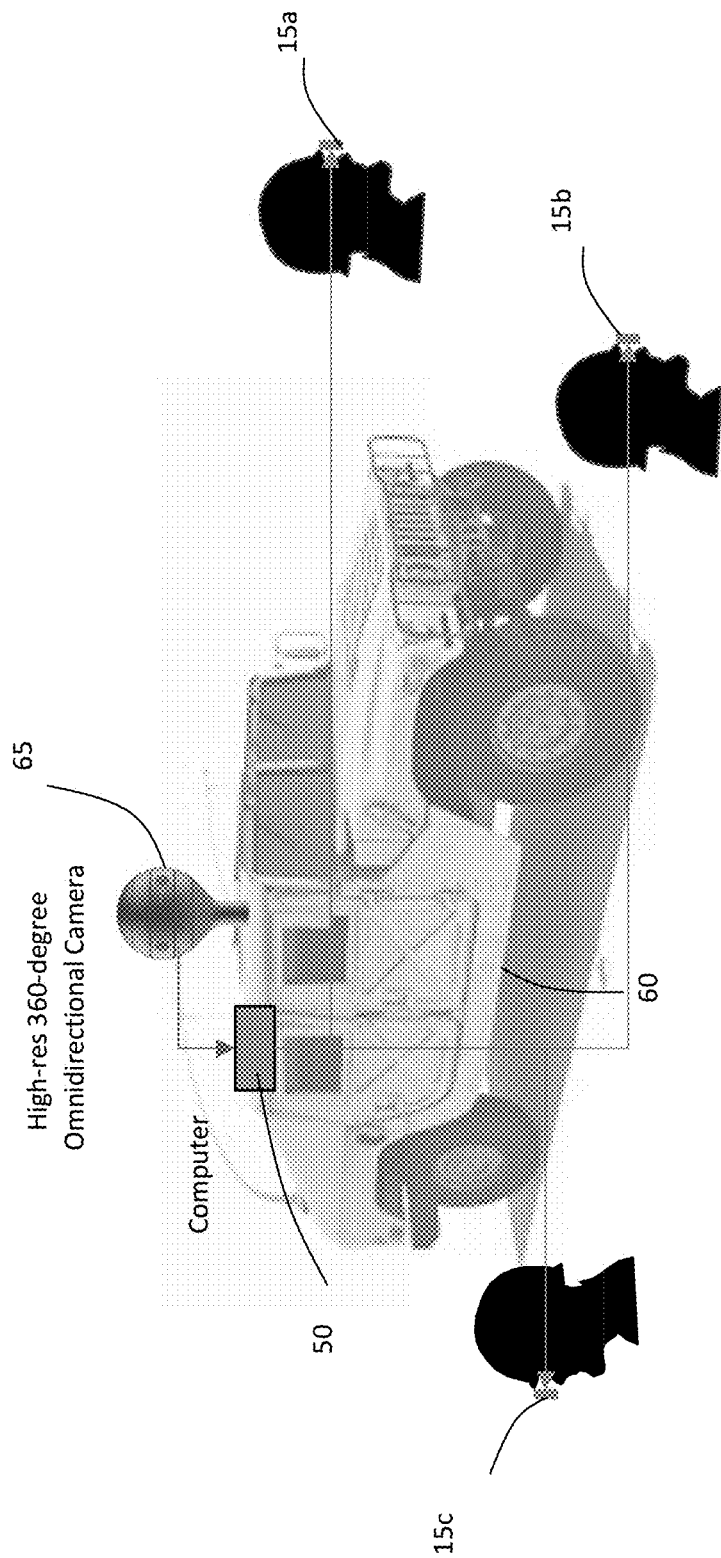
FIG. 8 is a diagrammatic view of an embodiment of the invention showing a 360-degree, omnidirectional vehicle-mounted camera distributing to a plurality of helmet-mounted displays.

FIG. 8 shows omnidirectional camera 65 affixed to the top of military vehicle 60, as shown in FIG. 6, but computer 50 distributes image data to multiple head-mounted, see-through displays 15a-15c. It should be noted that see-through displays 15a and 15b are directed in a different direction from 15c. IMUs on military vehicle 60 and see-through displays 15a-15c register their position and orientation so that users looking in different directions have a consistent spatial representation of the detected object relative to their line of sight.

Figure 9:
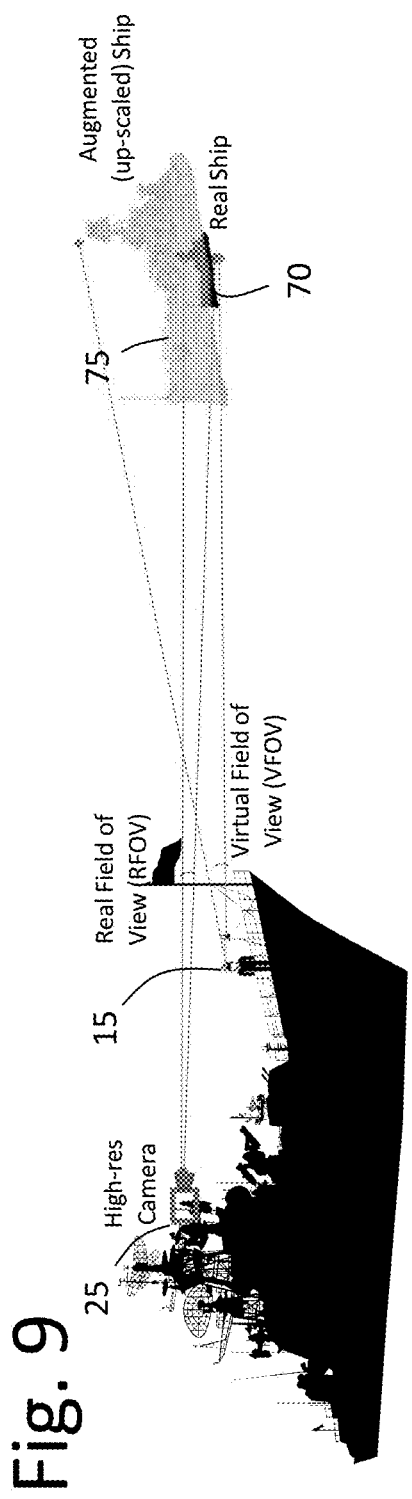
FIG. 9 is a diagrammatic view of an embodiment of the invention showing a ship-mounted camera on a first ship detecting a second ship and augmenting (scaling-up) a visual of the second ship to a head-mounted display worn by a sailor on the first ship.
Figure 10:
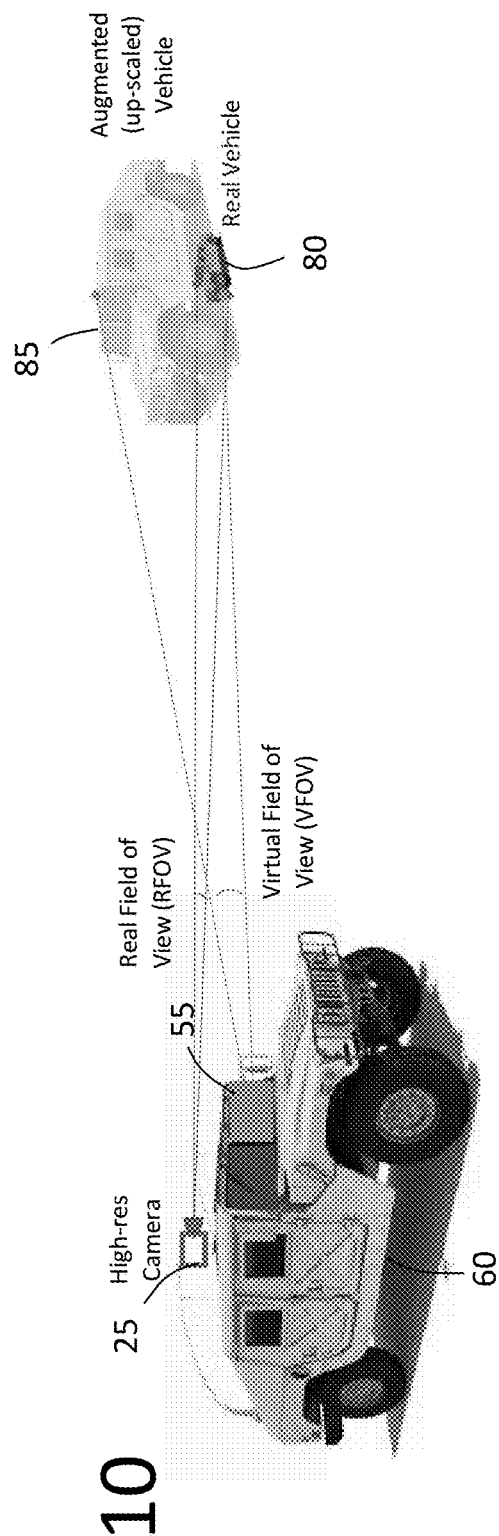
FIG. 10 is a diagrammatic view of an embodiment of the invention showing a vehicle-mounted camera affixed to a first vehicle detecting a distant second vehicle and presenting a scaled-up visual of the second vehicle on the windshield of the first vehicle.

FIG. 9 shows an embodiment of the invention with ship-mounted camera 25 and head-mounted display 15 in which the size of target ship 70 is increased to appear larger as augmented ship 75 for the viewer. The viewpoints and field of view of the camera, as well as of the see-through display, are illustrated. The method includes the necessary registration of the camera imagery and see-through display. In this case, the augmented ship's position is centered around the real ship's position and magnified upwards from the water level. FIG. 10 show another embodiment in which a target High Mobility Multipurpose Wheeled Vehicle (HMMWV) 80 is magnified to vehicle-mounted camera 25 and rendered as augmented vehicle 85 onto windshield-mounted heads-up display 55.

Figure 11:
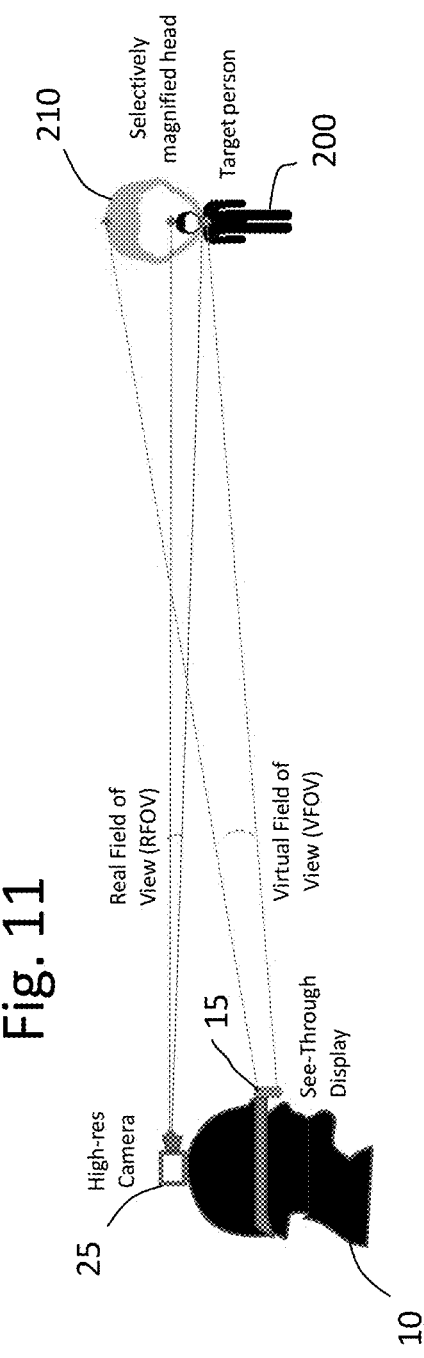
FIG. 11 is a diagrammatic view of an embodiment of the invention showing a helmet/head mounted assembly wherein the head of a targeted person is selectively magnified.
Figure 12:
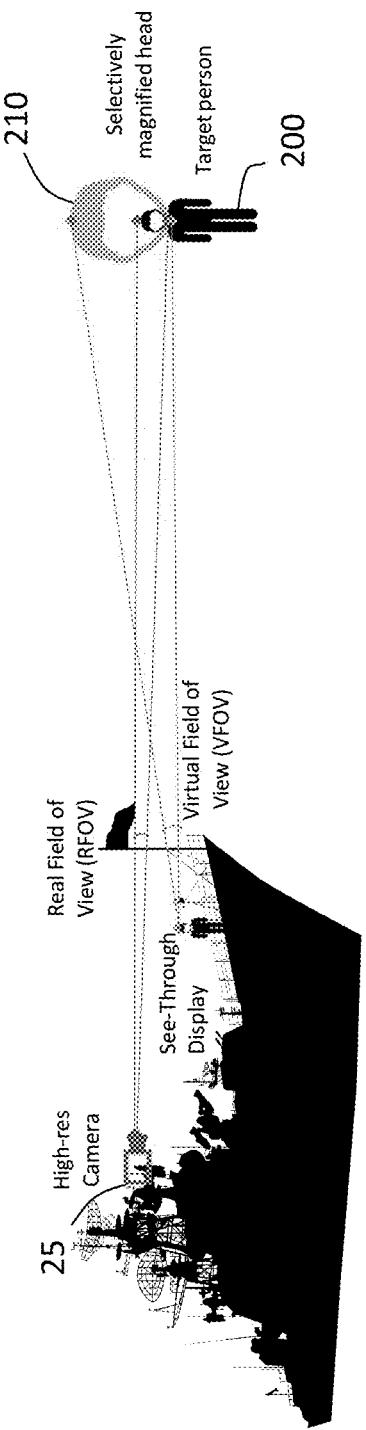
FIG. 12 is a diagrammatic view of an embodiment of the invention showing a ship-mounted camera wherein the head of a targeted person is selectively magnified on a sailor's HMD.

FIG. 11 shows an example with a head-mounted camera 25 and head-mounted display 15 in which a target person's 200 captured head 210 size is increased to appear larger for the viewer. The viewpoints and field of view of the camera, as well as of the see-through display, are illustrated. The method includes the necessary registration of the camera imagery and see-through display. In this case, only the head is magnified, while the method ensures that the head remains connected to the target human's head. FIG. 12 shows a similar arrangement with a ship-mounted camera 25 and head-mounted display 15 on a sailor at the bow of the ship. FIG. 13 shows a similar arrangement with a vehicle-mounted camera 25 and windshield see-through display 55. FIG. 14 shows a similar arrangement with a drone-mounted camera 25 and head-mounted display 15.

Figure 15:
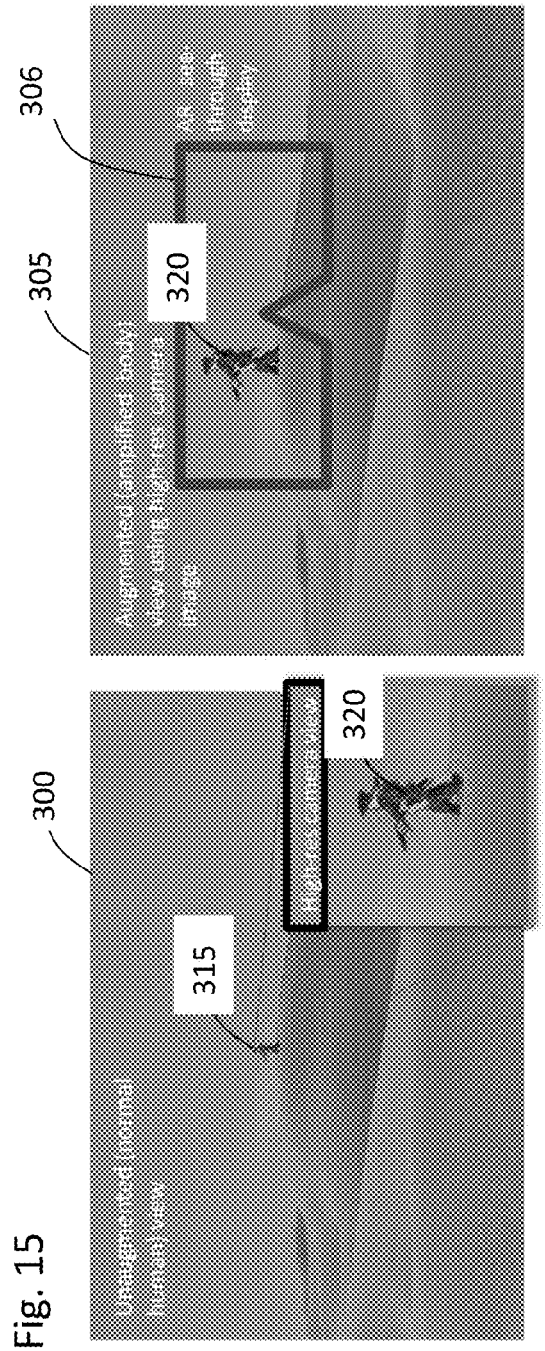
FIG. 15 is a simulated HMD augmented reality magnification of a human target overlaid over the target's location.
Figure 16:
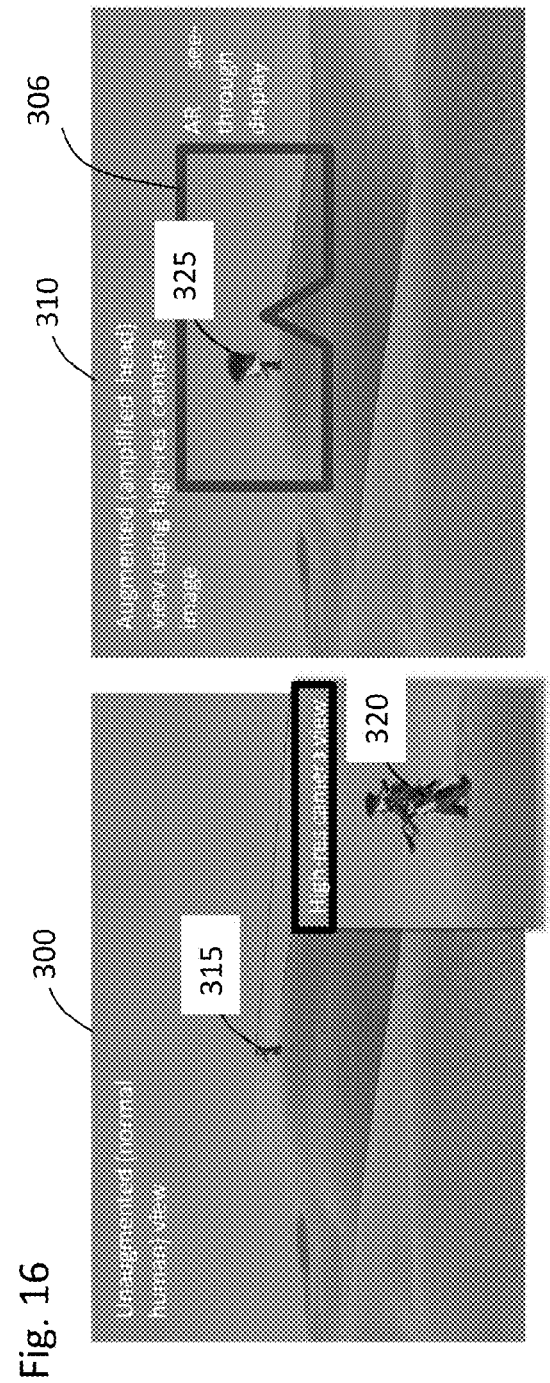
FIG. 16 is a simulated HMD augmented reality magnification of a human target's enlarged head overlaid over the target's location.

FIG. 15 shows a first non-augmented (normal human) view 300 of a target person 315 compared to a high-resolution view 320 of the same target person. View 305 superimposes the high-resolution view 320 (e.g., magnified view) of the target person 315 within the augmented reality see-through display frame 306. The landscape (sand dunes in this example) is not magnified, and the context of a human target 315 identified as an object is superimposed so that the magnified version 320 of the target person 315 is elevated to appear to be walking on the same surface as the unmagnified view. FIG. 16 shows a similar view output except that only the head 325 of the target person 315 is enlarged. The scaled-up head is superimposed at coordinates to appear visually connected to the neck and torso of the un-magnified target person 315.

Figure 17:
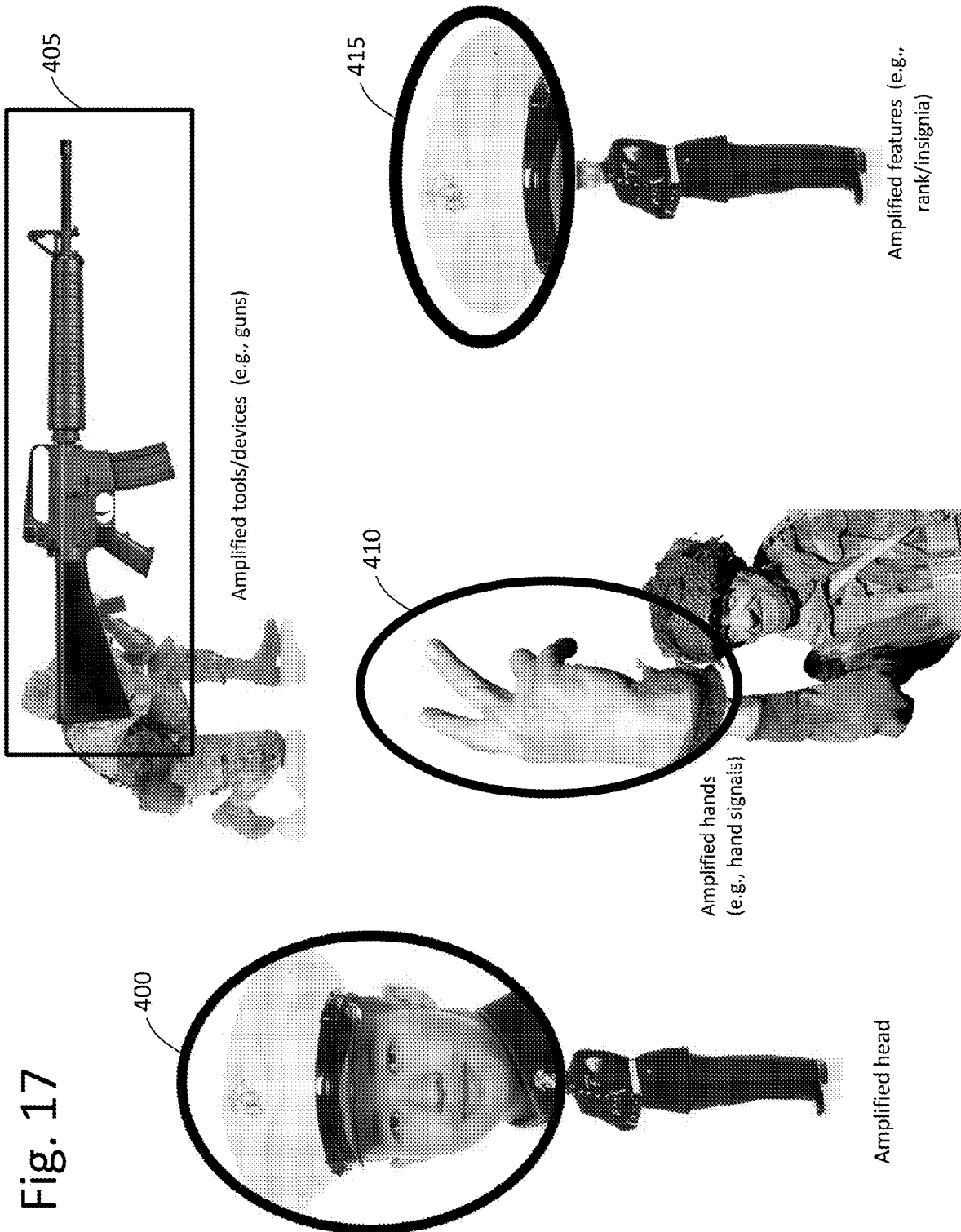
FIG. 17 is a diagrammatic view of an embodiment of the invention wherein enlarge portions of an identified object are presented on an electronic display.
Figure 18:
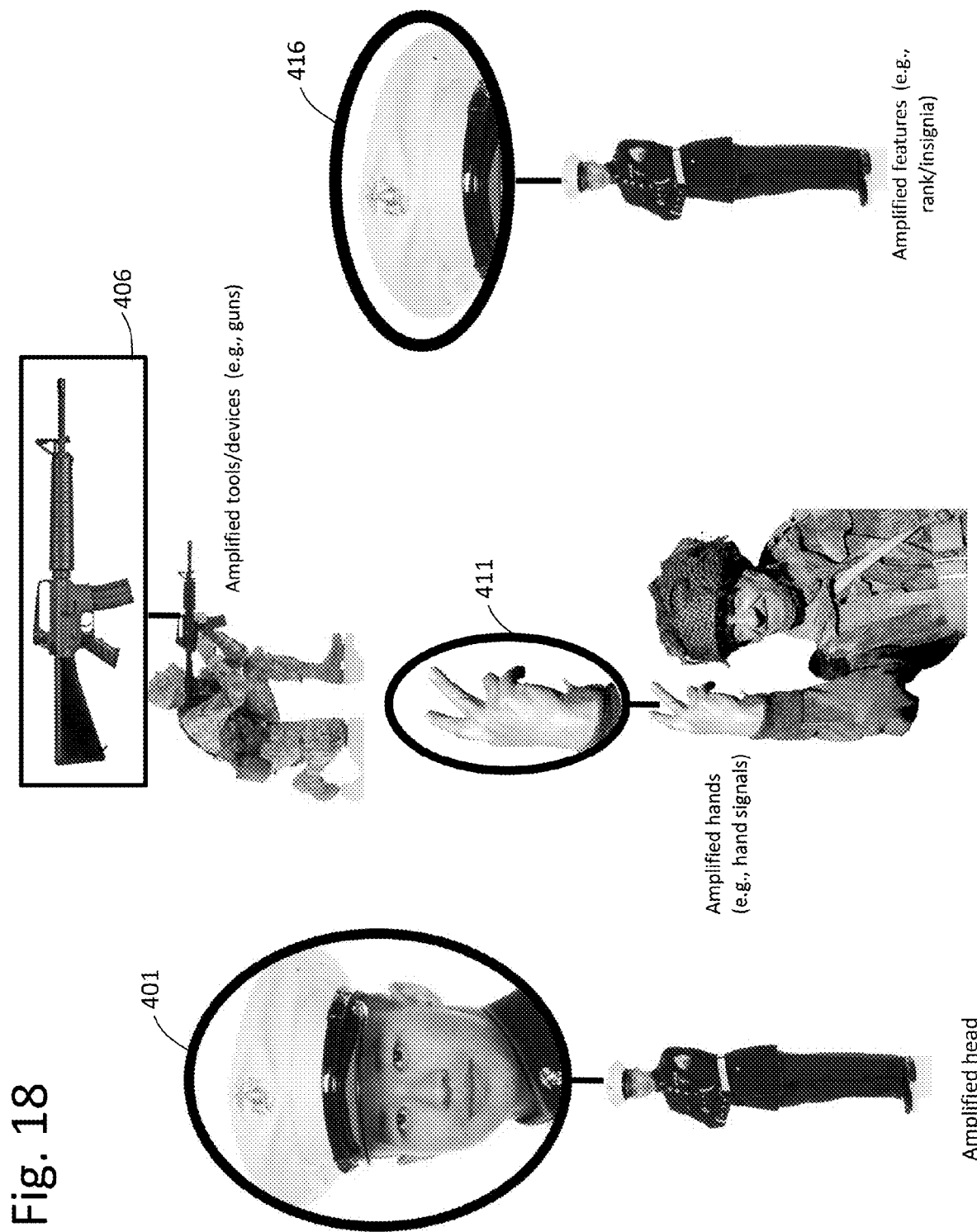
FIG. 18 is a diagrammatic view of an embodiment of the invention wherein enlarge portions of an identified object are presented offset from the targeted object on an electronic display wherein the originally sized portion is not occluded by the magnified portion.

FIG. 17 shows some examples of selective augmentation/magnification of objects wherein the magnified portion is positioned in continuous relation to the unmagnified portion. The black frames (stroke lines) are included for illustration purposes, but similar highlighting could also occur in the final view. Examples include a magnified head 400; magnified weapon 405; magnified hand signals 410; and magnified insignia 415. FIG. 18 shows an alternative embodiment where the magnified portions of the object are offset as to avoid any occlusion of the unmagnified object: offset, magnified head 401; offset, magnified weapon 406; offset, magnified hand signals 411; and offset magnified insignia 416.

Figure 19:
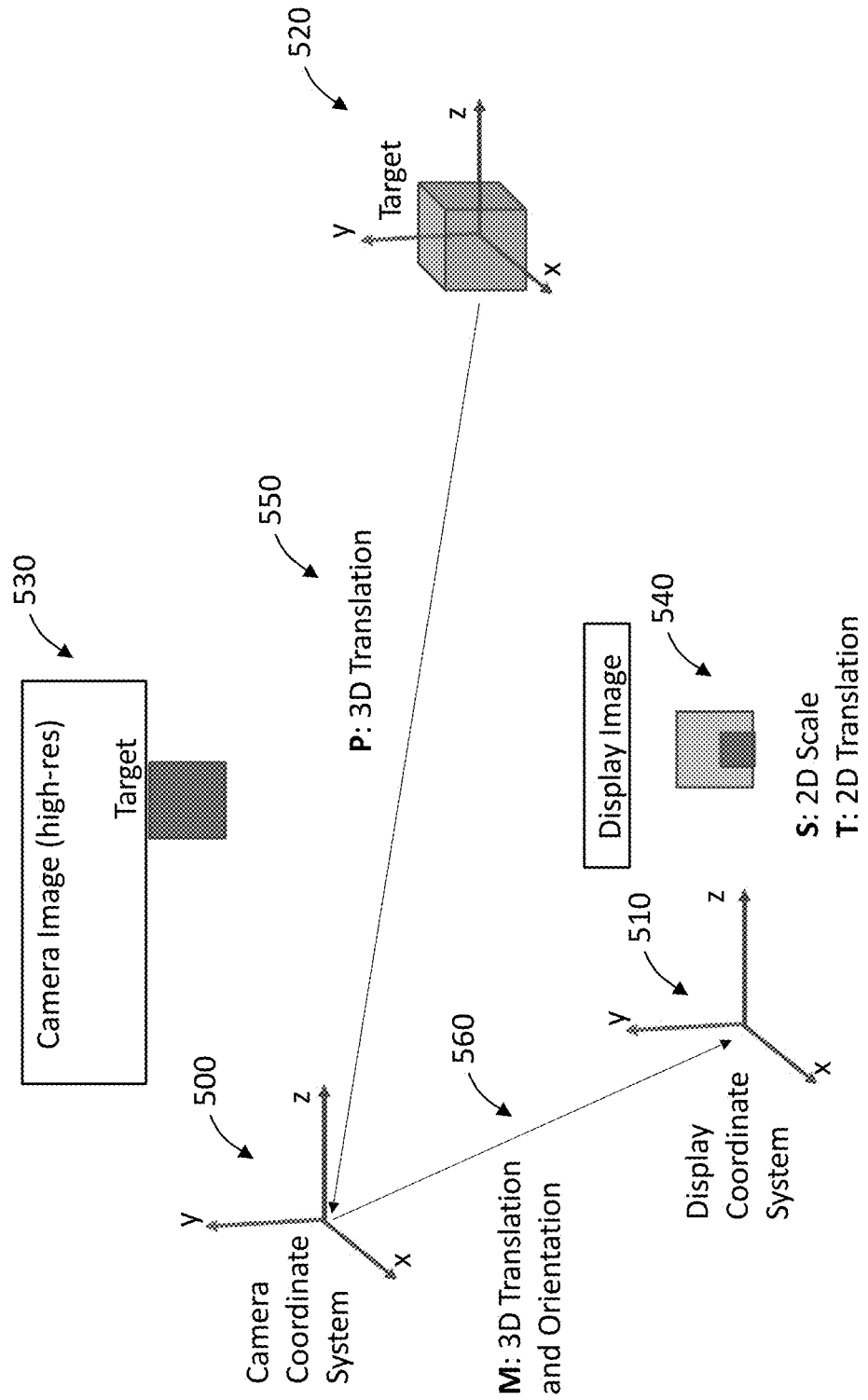
FIG. 19 is a diagrammatic view of an embodiment of the invention showing a series of transformations aligning the target in camera coordinates with the corresponding portion of the field of view in display coordinates.

FIG. 19 illustrates an example of how a series of transformations can align the target in camera coordinates with the corresponding portion of the field of view in display coordinates. The camera coordinate system 500 may set a 3D translation 550 of a target 520 that is captured with a high-resolution image 530. For the captured image to display logically to a user's HMD, 3D translation and orientation 560 may occur between the display coordinate system 510 of the HMD worn by the user and the camera coordinate system 500 which may be mounted on the HMD or a separate object (e.g., ship, drone, vehicle or other user's HMD). Computer processing of the high-resolution image 530 intelligently selects the object from the background and superimposes an altered (usually magnified) representation of the object over the un-scaled background to the HMD as a composite display image 540. Both the 2D scale (magnification) and the 2D translation (positioning) of the extracted object may be adjusted in the rendering of the display image 540.

Figure 20:
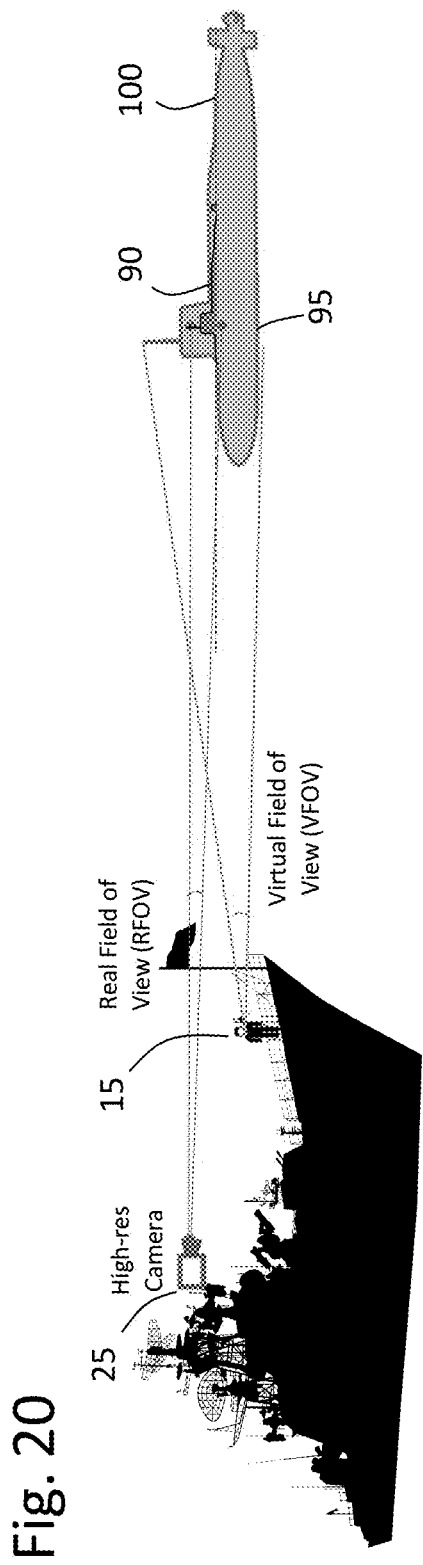
FIG. 20 is a diagrammatic view of an embodiment of the invention showing a ship-mounted camera detecting a partially submerged submarine.

FIG. 20 shows a ship-mounted high-resolution camera 25 detecting only the conning tower 90 of a submarine extending up from waterline 100. Underneath the conning tower 90 logically exists the majority of the surface area of the submarine. According to an embodiment of the invention, semi-occluded objects are identified, and a representation of the non-occluded portions are rendered into the image viewed by the user. In this case, the full and magnified body of the submarine 95 is presented. It should also be noted that the 2D translation of this is context-sensitive to the type of object. While a magnified surface ship might be scaled upwards from waterline 100, a magnified submarine is logically scaled downwards from waterline 100. This concept is further illustrated in FIGS. 21 and 22, which show the rendered submerged portions of the submarine under waterline 100. In an alternative embodiment shown in FIG. 22, rendered submarine 95 has little to no scaling as the visual enhancement is complementing the small conning tower, which alone, may not be visible without the high-resolution imaging.

As previously noted in FIGS. 6-8, omnidirectional cameras may be employed to gather a wide field of view. An advantage of this is object/threat detection that exceeds that of a human line of sight (LOS). A normal visual field is an island of vision measuring 90 degrees temporally to central fixation, 50 degrees superiorly and nasally, and 60 degrees inferiorly. For binocular vision, 210-degrees horizontally and 150-degrees vertically.

Some references suggest a human eye at 20/20 vision resolves the equivalent of a 52-megapixel camera assuming a 60-degree angle of view. To widen this to a human's LOS, multiple CMOS sensors at this resolution are beneficial because 60 degrees is relatively tunnel-vision in comparison. Two to four sensors at 52-megapixel cover a substantial field of view, but for the omnidirectional cameras in FIGS. 6-8, additional imaging sensors may be beneficial depending on the mission and application.

Figure 23:
FIG. 23 wide-field image view of a ship on an expanse of ocean.
Figure 24:
FIG. 24 wide-field image view of a ship on an expanse of ocean with an overlaid, rendered, color-enhanced enlargement of the ship.
Figure 25:
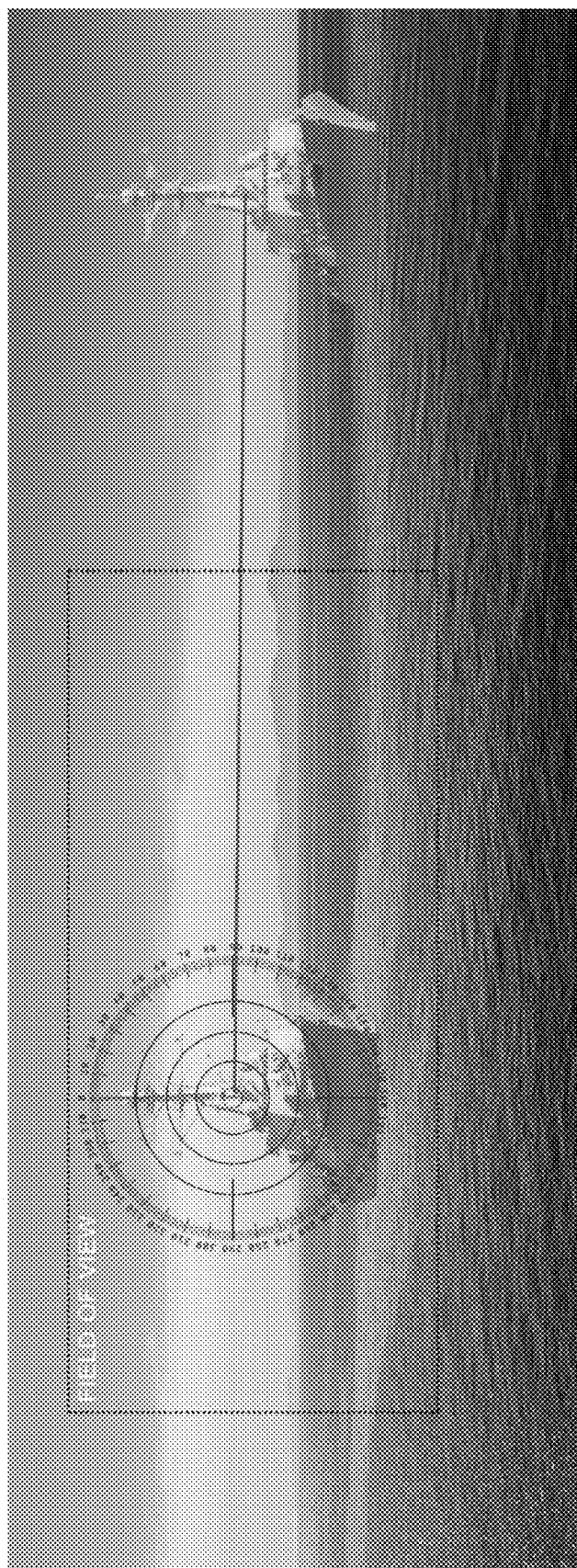
FIG. 25 wide-field image view of a ship on an expanse of ocean with an overlaid, rendered, color-enhanced enlargement of the ship having a second representation of the rendered enlargement within a field of view of a user and an indicium as to the spatial location of the actual ship outside the current field of view.

However, visual acuity increases from movement discrimination in the extreme peripheral vision to better than 20/20 in the center of vision. While at the periphery, human vision is poor, high-resolution camera sensors suffer no such limitation. For a solider, the omnidirectional camera system is covering his "six" (behind him). The HMD display may show the detected object with a superimposed compass or similar indicia showing its position relative until the HMD puts the object directly into the user's LOS. This is shown in FIGS. 23-25 for a wide view image of a distant ship (FIG. 23). The computer extracts the ship and superimposes a scaled image in FIG. 24. However, for a wide view camera (or omnidirectional), the detection of the object may be outside the LOS of the HMD or other image display for the user. FIG. 25 shows an embodiment of the invention wherein the scaled ship image is presented within the field of view of the user even though the actual ship is outside of the field of view. This is communicated to the user by a graphic notation such as compass indicia or lead lines to the actual detected object outside of the LOS. The user is prompted to move their head or reorient the display coordinates to bring the detected object into the LOS.

Computer and Software Technology

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions, in fact, result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any non-transitory, tangible medium that can contain, or store a program for use by or in connection with an instruction execution system, apparatus, or device. Storage and services may be on-premise or remotely, such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a computer-readable storage medium, and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk, or the like.

Program code embodied on a machine-readable medium may be transmitted using any appropriate medium, including but not limited to wireless, wireline, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA, and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

Glossary of Claim Terms

Augmented Reality means technologies that superimposes a computer-generated image on a user's view of the real world, thus providing a composite view.

Communicatively Coupled means a data connection between one or more computing, sensor, storage, and/or networking devices wherein information is exchanged.

Foreground detection is a task within the field of computer vision and image processing. Foreground detection separates foreground objects from relatively static background scenes based on these changes taking place in the foreground. It is a set of techniques that typically analyze video sequences recorded in real-time with a stationary camera. It is also related to background subtraction techniques, which allows an image's foreground to be extracted for further processing (object recognition, etc.). Processes that enable foreground detection include temporal average filters, frame differencing, mean filters, and running gaussian averaging.

Head Mounted Display (HMD) is a digital display device worn on the head or integrated into a helmet. An HMD may present a completely virtual reality environment or may also reflect projected images wherein a user may see through it in augmented reality environments. Some commercially available HMDs include those sold under the brands OCULUS RIFT and MICROSOFT HOLOLENS.

Heads up Display (HUD) is a transparent display that presents data without requiring users to look away from their usual viewpoints.

Indicia (or Indicium) means signs, indications, or distinguishing marks. For the purposes of claim construction, an indicium (singular) does not preclude additional indicium (e.g., indicia or multiple orientation marks).

Mixed Reality means the combination of virtual and real worlds to generate new environments and visualizations wherein physical and digital objects co-exist and interact in real-time.

Optical means operating in or employing the visible part of the electromagnetic spectrum.

Pixel means a physical point in a raster image.

Positional tracking means the detection of precise and/or estimated positions of head-mounted displays, controllers, or other objects within Euclidean space. Positional tracking registers the position due to recognition of the rotation (pitch, yaw, and roll) and recording of the translational movements for instance through inertial measurement units (IMUs).

Real-time image stream means a continuous video transmission or a continuously transmitted sequence of individual/separate camera images. Real-time means any image transmission or video streaming system that meets the timely information requirements of the application context.

Sensor means a device or peripheral thereof that detects or measures a physical property and records, indicates, or otherwise responds to it.

Virtual Environment means the audio, visual, tactile, and other sensory features of a computer-generated simulation.

Virtual Reality means a computer-generated simulation of a three-dimensional image or environment that can be interacted with in a seemingly real or physical way by a person using special electronic equipment, such as a helmet with a screen inside or gloves fitted with sensors The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method of intelligent object magnification the method comprising:
   receiving an image stream;
   accessing the image stream by a first computer processor having at least one computer vision algorithm to classify a target of a pre-defined category from the image stream, the image stream of the classified target having a foreground representing the target, a background in which the target exists and a baseline surface over which the target moves or rests;
   segmenting into an image region the foreground of the classified target by the first computer processor or a second computer processor from the background such that substantially only those pixels showing the image region are further processed;
   transmitting the image region to a rendering engine to generate an output for a display;
   creating in the rendering engine, a first mathematical transformation defining a scaling factor by which the segmented image region should be up-scaled compared to the classified target;
   further creating in the rendering engine, a second mathematical transformation comprising a vertical positional translation of the segmented image region, the vertical positional translation defined by the baseline surface whereby the vertical positional translation moves the segmented image region upwards or downwards so that the classified target, now up-scaled in the segmented image region, is positionally translated at a logical altitude respective to the baseline surface in proportion to the scaling factor, the segmented image region up-scaled by the first mathematical transformation is a vehicle and the baseline surface is a solid surface over which the vehicle moves, whereby the scaling factor determines the logical altitude to which the segmented image region is elevated;
   generating in the rendering engine pixels of the image region of the classified target, the image region modified by the first and second transformations; and
   presenting the pixels of the image region superimposed over the background through the display.

2. The computer-implemented method of claim 1 wherein the logical altitude is computed by the steps comprising:
   computing the vertical size of the vehicle after up-scaled;
   subtracting the vertical size of the vehicle prior to up-scale;
   setting the logical altitude by elevating the up-scaled vehicle by half the difference upward; and
   displaying the up-scaled vehicle through the display wherein a lowermost portion of the up-scaled vehicle is in contact with the baseline surface.

3. The computer-implemented method of claim 1 wherein the image stream is real-time.

4. A computer-implemented method of intelligent object magnification the method comprising:
   receiving an image stream;
   accessing the image stream by a first computer processor having at least one computer vision algorithm to classify a target of a pre-defined category from the image stream, the image stream of the classified target having a foreground representing the target, a background in which the target exists and a baseline surface over which the target moves or rests;
   segmenting into an image region the foreground of the classified target by the first computer processor or a second computer processor from the background such that substantially only those pixels showing the image region are further processed;
   transmitting the image region to a rendering engine to generate an output for a display;
   creating in the rendering engine, a first mathematical transformation defining a scaling factor by which the segmented image region should be up-scaled compared to the classified target;
   further creating in the rendering engine, a second mathematical transformation comprising a vertical positional translation of the segmented image region, the vertical positional translation defined by the baseline surface whereby the vertical positional translation moves the segmented image region upwards or downwards so that the classified target, now up-scaled in the segmented image region, is positionally translated at a logical altitude respective to the baseline surface in proportion to the scaling factor, the segmented image region up-scaled by the first mathematical transformation is a human and the baseline surface is a solid surface over which the human moves or rests, whereby the scaling factor determines the logical altitude to which the segmented image region is elevated so that the lowermost portion of the human is in contact with the baseline surface;

generating in the rendering engine pixels of the image region of the classified target, the image region modified by the first and second transformations; and presenting the pixels of the image region superimposed over the background through the display.

5. The computer-implemented method of claim 4 wherein the image stream is real-time.

6. The computer-implemented method of claim 5 wherein the object is a weapon.

7. The computer-implemented method of claim 5 wherein the object is a rank insignia.

8. The computer-implemented method of claim 5 wherein the image stream is real-time.

9. A computer-implemented method of intelligent object magnification the method comprising:

receiving an image stream;

accessing the image stream by a first computer processor having at least one computer vision algorithm to classify a target of a pre-defined category from the image stream, the image stream of the classified target having a foreground representing the target, a background in which the target exists and a baseline surface over which the target moves or rests;

segmenting into an image region the foreground of the classified target by the first computer processor or a second computer processor from the background such that substantially only those pixels showing the image region are further processed;

transmitting the image region to a rendering engine to generate an output for a display;

creating in the rendering engine, a first mathematical transformation defining a scaling factor by which the segmented image region should be up-scaled compared to the classified target;

further creating in the rendering engine, a second mathematical transformation comprising a vertical positional translation of the segmented image region, the vertical positional translation defined by the baseline surface whereby the vertical positional translation moves the segmented image region upwards or downwards so that the classified target, now up-scaled in the segmented image region, is positionally translated at a logical altitude respective to the baseline surface in proportion to the scaling factor, the segmented image region up-scaled by the first mathematical transformation is a partially submerged ship and the baseline surface a waterline of the partially submerged ship, the method further comprising the steps of:

computing the vertical size of the up-scaled ship;
subtracting the vertical size of the real-scale ship;
translating the up-scaled ship by half the difference upward; and displaying the translated up-scaled ship in the image region whereby the up-scaled ship is presented on the waterline of the unmagnified background;

generating in the rendering engine pixels of the image region of the classified target, the image region modified by the first and second transformations; and presenting the pixels of the image region superimposed over the background through the display.

10. The computer-implemented method of claim 9 wherein the image stream is real-time.

11. A computer-implemented method of intelligent object magnification the method comprising:

receiving an image stream;

accessing the image stream by a first computer processor having at least one computer vision algorithm to classify a human target from the image stream, the image stream of the human target having a foreground representing a morphological shape and an object in physical contact with the morphological shape, the image stream further including a background in which the human target exists;

segmenting into an image region the object in physical contact with the human target by the first computer processor or a second computer processor from the background such that substantially only those pixels showing the image region are further processed;

transmitting the image region to a rendering engine to generate an output for a display;

creating in the rendering engine, a first mathematical transformation defining a scaling factor by which the segmented image region should be up-scaled compared to the classified target;

further creating in the rendering engine, a second mathematical transformation comprising a positional translation of the segmented image region, the positional translation defined by the morphological shape whereby the positional translation moves the segmented image region so that the up-scaled image region of the object is positionally translated at a logical location respective to the morphological shape in proportion to the scaling factor, generating in the rendering engine pixels of the image region of the object, the image region modified by the first and second transformations; and presenting the pixels of the image region superimposed over the background through the display.

12. A computer-implemented method of intelligent object magnification the method comprising:

receiving an image stream;

accessing the image stream by a first computer processor having at least one computer vision algorithm to classify a human target from the image stream, the image stream of the human target having a foreground representing a head and a torso, the image stream further including a background in which the human target exists;

segmenting into an image region the head of the human target by the first computer processor or a second computer processor from the background such that substantially only those pixels showing the image region are further processed;

transmitting the image region to a rendering engine to generate an output for a display;

creating in the rendering engine, a first mathematical transformation defining a scaling factor by which the segmented image region should be up-scaled compared to the classified target;

further creating in the rendering engine, a second mathematical transformation comprising a vertical positional translation of the segmented image region, the vertical positional translation defined by a baseline surface whereby the vertical positional translation moves the segmented image region upwards so that the up-scaled image region of the head is positionally translated at a logical altitude respective to the torso in proportion to the scaling factor, generating in the rendering engine pixels of the image region of the human target, the image region modified by the first and second transformations; and presenting the pixels of the image region superimposed over the background through the display.

13. The computer-implemented method of claim 12 wherein the image stream is real-time.

* * * * *